(12) United States Patent
Ursescu et al.

(10) Patent No.: US 10,314,285 B1
(45) Date of Patent: Jun. 11, 2019

(54) PLATFORM AND GUIDE PANEL FOR AIRCRAFT CABIN EGRESS

(75) Inventors: Marius I. Ursescu, Mill Creek, WA (US); Carl Aaron Davison, Snohomish, WA (US); Andrew P. Keleher, Snohomish, WA (US); Edward W. Gillette, Everett, WA (US); Kenneth G. Davis, Brier, WA (US); Andrew Francis Szerlag, Marysville, WA (US)

(73) Assignee: The Boeing Company, Chicago, IL (US)

( * ) Notice: Subject to any disclaimer, the term of this patent is extended or adjusted under 35 U.S.C. 154(b) by 626 days.

(21) Appl. No.: 13/425,208

(22) Filed: Mar. 20, 2012

(51) Int. Cl.
  *B64D 11/00* (2006.01)
  *A01K 1/02* (2006.01)

(52) U.S. Cl.
  CPC .......... *A01K 1/0272* (2013.01); *A01K 1/0245* (2013.01)

(58) Field of Classification Search
  CPC ....... B64D 11/04; B64D 11/00; B64D 11/003; B64D 2011/0046; B64D 11/0691; B64D 11/0604; B64D 11/0606; B64D 2011/0069; B64D 2011/0084; B64D 45/0015; B64D 2011/0076; Y02T 50/46; Y02T 50/56
  USPC ..................................................... 244/118.5
  See application file for complete search history.

(56) References Cited

U.S. PATENT DOCUMENTS

| | | | |
|---|---|---|---|
| 2,506,380 A | 5/1950 | Myers | |
| 3,861,541 A * | 1/1975 | Taft et al. | 414/345 |
| 4,066,277 A | 1/1978 | Buchsel | |
| 4,109,759 A | 8/1978 | Cundiff | |
| 4,235,399 A * | 11/1980 | Shorey | B64C 1/22 14/71.1 |
| 4,498,648 A * | 2/1985 | DeLuca | B64C 1/1415 244/118.3 |
| 5,108,048 A * | 4/1992 | Chang | 244/118.1 |
| 5,335,880 A * | 8/1994 | Klug | B64C 1/1415 105/280 |
| 5,395,075 A | 3/1995 | Sprenger et al. | |
| 6,003,813 A | 12/1999 | Wentland et al. | |
| 6,045,204 A | 4/2000 | Frazier et al. | |
| 6,520,451 B1 | 2/2003 | Moore | |
| 6,581,876 B2 | 6/2003 | Cheung | |
| 6,932,298 B1 | 8/2005 | Mills | |

(Continued)

OTHER PUBLICATIONS

Keleher et al., "Aircraft Cabin Egress", U.S. Appl. No. 13/425,191, filed Mar. 20, 2012, 54 pages.

(Continued)

*Primary Examiner* — Joshua J Michener
*Assistant Examiner* — George Andonyan
(74) *Attorney, Agent, or Firm* — Yee & Associates, P.C.

(57) ABSTRACT

A system and method for exiting an overhead area in an aircraft. An egress apparatus is automatically moved from a closed state to an open state in response to opening a hatch that closes an opening in an overhead area in an aircraft. The apparatus comprises a platform attached to a substantially vertical structure by a first hinge structure. A guide panel is attached to the platform by a second hinge structure. The apparatus is configured to be moved from a closed state to an open state. The platform extends outward from the substantially vertical structure and under the opening in an overhead area in an aircraft when the apparatus is the open state. The guide panel extends upward from the platform when the apparatus is in the open state.

18 Claims, 12 Drawing Sheets

(56) References Cited

U.S. PATENT DOCUMENTS

| | | | |
|---|---|---|---|
| 6,986,485 B2 | 1/2006 | Farnsworth | |
| 7,377,080 B2 | 5/2008 | Mills | |
| 7,735,907 B2 | 6/2010 | Mahoney et al. | |
| 7,887,008 B2 * | 2/2011 | Lamoree et al. | 244/118.1 |
| 8,152,102 B2 | 4/2012 | Warner et al. | |
| 8,328,137 B2 | 12/2012 | Sutthoff et al. | |
| 8,342,449 B2 | 1/2013 | Schuld et al. | |
| 2003/0052227 A1 * | 3/2003 | Pittman | 244/118.5 |
| 2008/0078871 A1 * | 4/2008 | Munson et al. | 244/118.5 |
| 2008/0217475 A1 * | 9/2008 | Allison | 244/114 R |
| 2010/0019087 A1 | 1/2010 | Warner et al. | |
| 2010/0140400 A1 | 6/2010 | Helfrich et al. | |
| 2010/0140402 A1 | 6/2010 | Jakubec et al. | |
| 2010/0206988 A1 * | 8/2010 | Woodland | 244/129.5 |
| 2010/0301163 A1 | 12/2010 | Guering et al. | |
| 2011/0233333 A1 | 9/2011 | Papke | |
| 2014/0290555 A1 * | 10/2014 | Chezhian | 114/349 |

OTHER PUBLICATIONS

Office Action, dated May 16, 2014, regarding U.S. Appl. No. 13/425,191, 22 pages.

"Pilot Rest Accommodations for 777 Flight Crew," ISO/FAA Production Certificate, 2 pp., accessed Nov. 18, 2011, http://www.beaerospace.com/PDF/FSI_DR_1_OFCR1.pdf.

"Comfortable Accommodations for 777 Flight Attendants," ISO/FAA Production Certificate, 2 pp., accessed Nov. 18, 2011, http://www.beaerospace.com/PDF/FSI_DR_3_OHAR.pdf.

Final Office Action, dated Jan. 5, 2015, regarding U.S. Appl. No. 13/425,191, 17 pages.

Office Action, dated May 22, 2015, regarding U.S. Appl. No. 13/425,191, 20 pages.

Office Action, dated Oct. 2, 2015, regarding U.S. Appl. No. 13/425,191, 19 pages.

Notice of Allowance, dated Jan. 12, 2016, regarding U.S. Appl. No. 13/425,191, 9 pages.

* cited by examiner

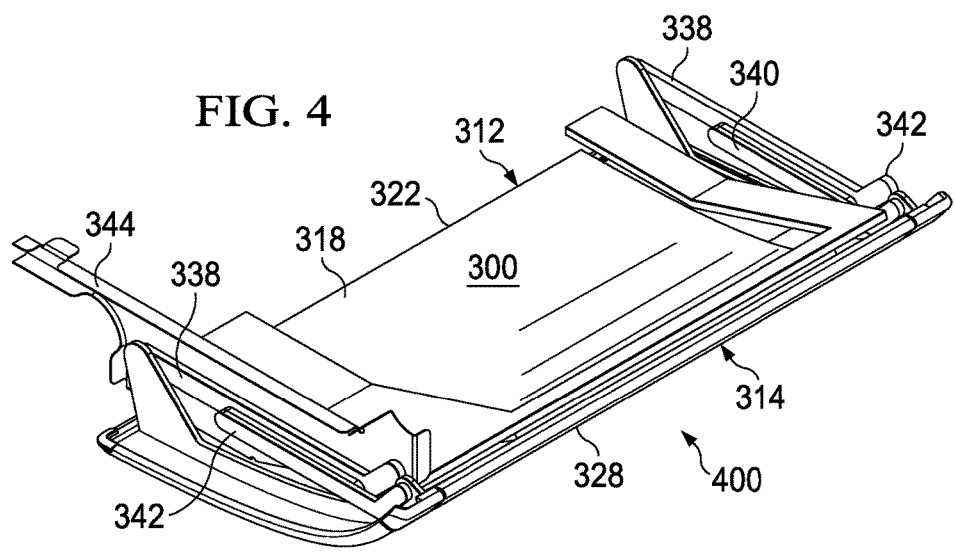
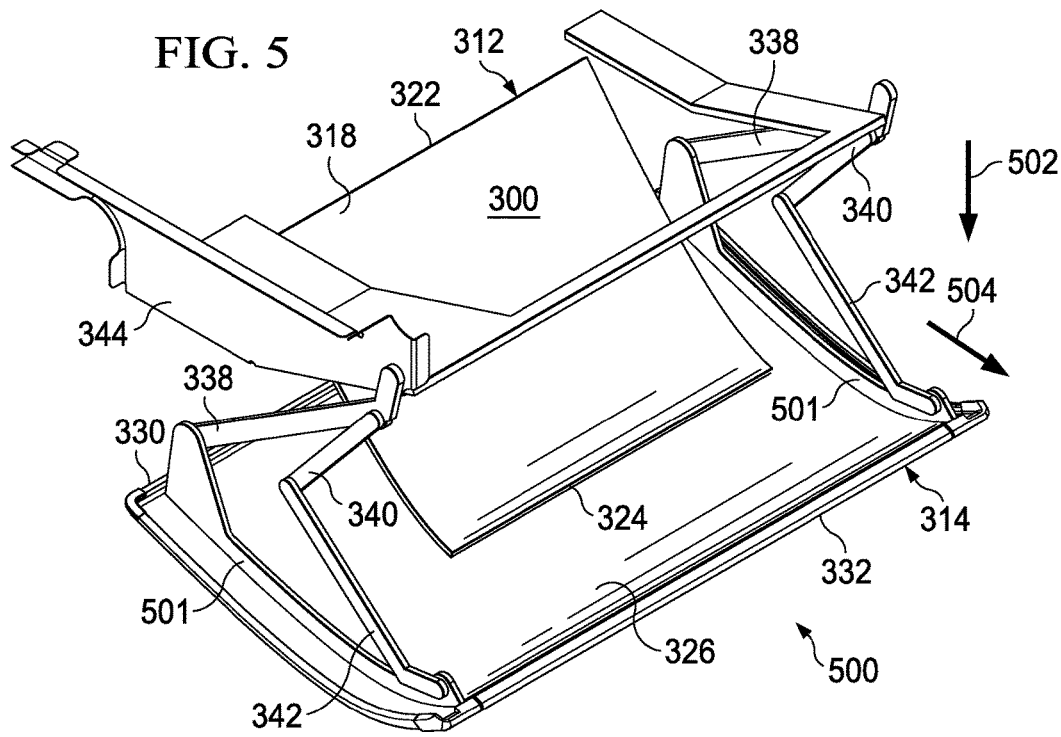

PLATFORM AND GUIDE PANEL FOR AIRCRAFT CABIN EGRESS

BACKGROUND INFORMATION

1. Field

The present disclosure relates generally to aircraft and to mechanical safety features on aircraft. More particularly, the present disclosure relates to mechanical structures for providing rapid egress from aircraft cabins.

2. Background

Commercial passenger aircraft may include one or more areas where the aircraft crew may rest. Crew rest areas are particularly desirable on aircraft that are used for long duration flights. A crew rest area on an aircraft may include chairs, bunks, and various other amenities, such as a closet, sink, and lavatory.

A crew rest area may be provided in a cabin of the aircraft that is separated from the main cabins where passengers of the aircraft are seated. It has been found that a desirable location for the crew rest area may be in the overhead area of the aircraft. The overhead area of the aircraft is the area located generally between the top of stow bins in the main cabin and the crown of the aircraft. By taking advantage of the overhead area of the aircraft for a crew rest area, airlines may reserve use of the main deck area of the aircraft for revenue-generating passengers and cargo.

Primary access to and from a crew rest area located in the overhead area of the aircraft may be provided by a stairway or ladder from the main cabin of the aircraft to the crew rest area. The crew rest area preferably also includes a secondary exit. For example, the secondary exit may include a hatchway that provides a secondary escape path from the crew rest area to the aircraft main passenger cabin. Current designs for such an escape hatchway may allow an evacuee from the crew rest area to step down from the crew rest area onto main deck furniture or seats located below the crew rest area in the main passenger cabin. From there, the evacuee may step into a main aisle in the main passenger cabin and then exit the aircraft via a door in the main cabin. Other current designs for an escape hatchway may allow the evacuee to exit from the overhead crew rest area directly into an aisle located below the crew rest area in the main passenger cabin of the aircraft.

Some aircraft may include passenger suites in the main passenger cabin. A suite is a private passenger cabin that is walled off from the rest of the main passenger cabin. The suite may have an individual door for exiting and entering the passenger suite to and from the main cabin.

The arrangement of passenger suites, seats, and other furniture on the main deck of an aircraft may affect egress via the secondary exit from the crew rest area located above the main deck. For example, a desirable arrangement of passenger suites, seats, and other furniture on the main deck may interfere with the effective use of a conventional hatchway as means for egress from the crew rest area.

Accordingly, it would be desirable to have a method and apparatus that takes into account one or more of the issues discussed above as well as possibly other issues.

SUMMARY

An embodiment of the present disclosure provides an apparatus comprising a platform and a guide panel. The platform extends outward from a substantially vertical structure and below an opening in an overhead area in an aircraft. The guide panel extends upward from the platform.

Another embodiment of the present disclosure provides an apparatus comprising a platform and a guide panel. The platform is attached to a substantially vertical structure by a first hinge structure. The guide panel is attached to the platform by a second hinge structure. The apparatus is configured to be moved from a closed state to an open state. The platform extends outward from the substantially vertical structure and under an opening in an overhead area in an aircraft when the apparatus is in the open state. The guide panel extends upward from the platform when the apparatus is in the open state.

Another embodiment of the present disclosure provides a method for deploying an apparatus. A hatch that closes an opening in an overhead area in an aircraft is opened. The apparatus is automatically moved from a closed state to an open state in response to opening the hatch. The apparatus comprises a platform attached to a substantially vertical structure by a first hinge structure and a guide panel attached to the platform by a second hinge structure. The platform extends outward from the substantially vertical structure and under the opening when the apparatus is in the open state. The guide panel extends upward from the platform when the apparatus is in the open state.

The features, functions, and benefits can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and benefits thereof will best be understood by reference to the following detailed description of illustrative embodiments of the present disclosure when read in conjunction with the accompanying drawings, wherein:

FIG. 4 is an illustration of a perspective view of a ramp egress apparatus in a closed state in accordance with an illustrative embodiment;

FIG. 5 is an illustration of a perspective view of a ramp egress apparatus in a partially-open state in accordance with an illustrative embodiment;

DETAILED DESCRIPTION

Figure 1:
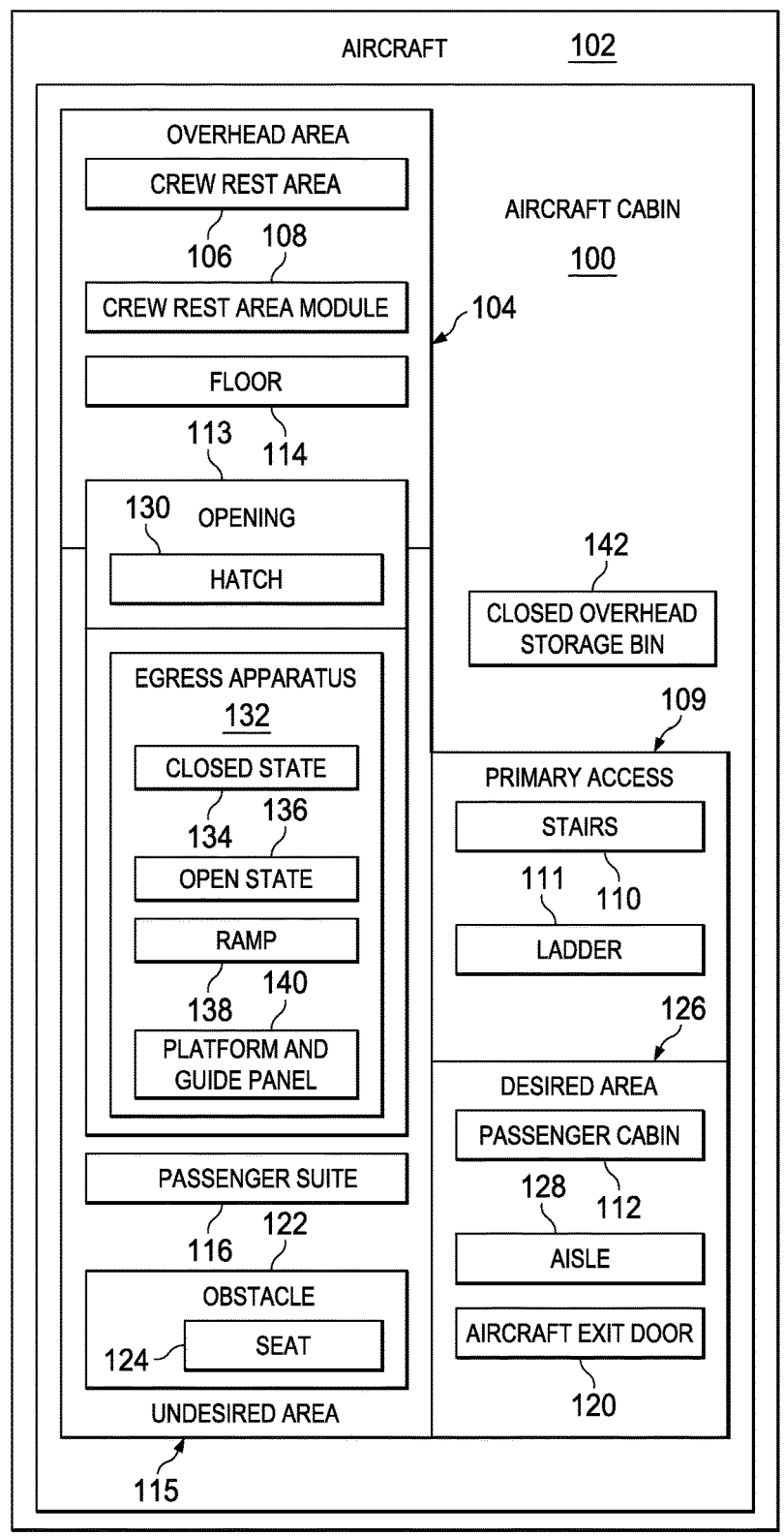
FIG. 1 is an illustration of a block diagram of an aircraft cabin in accordance with an illustrative embodiment.

The different illustrative embodiments recognize and take into account a number of different considerations. "A number of", as used herein with reference to items, means one or more items. For example, "a number of different considerations" means one or more different considerations.

The different illustrative embodiments recognize and take into account that the arrangement of passenger suites on the main deck of an aircraft may interfere with egress from a crew rest area located in an overhead area of an aircraft above the main deck. For example, a desirable arrangement of passenger suites on the main deck may result in a hatchway for exiting the crew rest area being positioned over a passenger suite. An evacuee using such a hatchway may thus exit the crew rest area into the passenger suite. The evacuee then must exit through the door of the passenger suite into the main passenger cabin before exiting the aircraft through a door in the main passenger cabin.

This route of escape from the crew rest area through a passenger suite presents a series of potential obstacles and, thus, may increase the time that it takes to exit the aircraft from the crew rest area. Furthermore, such an escape route may not be acceptable under applicable safety regulations. For example, safety regulations may prohibit the door of a passenger suite from being used for evacuation by anyone other than a passenger occupying the suite. In this case, it would not be acceptable for an evacuee from the crew rest area to enter and pass through the passenger suite during an evacuation of the aircraft.

The different illustrative embodiments also recognize and take into account that the arrangement of seats and other furniture in the main passenger cabin of an aircraft also may affect egress from a crew rest area located in the overhead area of an aircraft above the main cabin. For example, a desirable arrangement of passenger seats or other furniture in the main cabin may result in a hatchway for exiting the crew rest area being positioned above a seat or other furniture. In this case, the seat or other furniture may present an obstacle that an evacuee from the crew rest area must step on or over on the way to the aisle of the main cabin that leads to a door for exiting the aircraft. Such an obstacle may increase the time that it takes to exit the aircraft from the crew rest area. Furthermore, seats or other furniture located below the hatchway may need to be specifically designed or reinforced to support the weight of evacuees using the hatchway to exit the crew rest area.

Illustrative embodiments provide a system and method for egress from a crew rest area in an overhead area on an aircraft that is located over an area in an aircraft cabin where it is undesirable for an evacuee from the crew rest area to enter when evacuating the aircraft. For example, the crew rest area may be located over a number of passenger suites or obstacles in the main cabin of an aircraft. In this case, an escape hatchway provided in the crew rest area may open into a passenger suite or over other obstacles.

Illustrative embodiments provide an egress apparatus associated with a hatchway opening in the floor or other location in a crew rest area. The opening may be located over an area in an aircraft cabin where it is undesirable for an evacuee from the crew rest area to enter. The egress apparatus is configured to remain in a closed state during normal operation of the aircraft. In the closed state, the egress apparatus remains out of the way so that the impact of the egress apparatus on the activities of crew members and passengers on the aircraft is reduced. When needed, the egress apparatus may be deployed from the closed state to an open state by a crew member located in the crew rest area. In the open state, the egress apparatus is configured to direct a crew member from the opening located over the undesired area in the aircraft to a desired area for exiting the aircraft. For example, in the open state, the egress apparatus may direct the crew member from an opening in the crew rest area located over a passenger suite on the main deck of the aircraft to the main cabin of the aircraft. The crew member, therefore, may exit the aircraft from the crew rest area via the main cabin without entering the passenger suite or passing through the doorway between the passenger suite and the main cabin.

In one illustrative embodiment, the egress apparatus comprises a ramp provided in an opening formed in the overhead area of an aircraft over an undesired area on the main deck of the aircraft. The ramp is configured to move from a closed state to an open state. The ramp closes the opening when the ramp is in the closed state. As the ramp is moved from the closed state to the open state, the ramp rotates downward with respect to the opening and extends laterally outward away from the opening. When the ramp is in the open state, the ramp extends from the opening to a desired area in the aircraft cabin. Thus, an evacuee from a crew rest area in the overhead area may move through the opening and across the ramp to exit the crew rest area directly to the desired area in the aircraft cabin without entering the undesired area.

In another illustrative embodiment, the egress apparatus comprises a platform and guide panel attached to a wall located below an opening formed in the overhead area of an aircraft over an undesired area on the main deck of the aircraft. The opening is covered by a hatch. When the hatch is closed, the platform and guide panel may be in a closed state. In the closed state, the platform and guide panel may be folded up against the wall to which the platform and guide panel is attached. When the hatch is opened, the platform and guide panel may move to an open state. In the open state, the platform and guide panel extend outward from the wall into the space below the opening. In the open state, the platform and guide panel are configured to direct a crew member exiting the crew rest area through the opening to a desired area in the aircraft. Thus, an evacuee from the crew rest area may move through the opening and across the platform to exit the crew rest area directly to the desired area in the aircraft cabin without entering the undesired area.

Turning now to FIG. 1, an illustration of a block diagram of an aircraft cabin is depicted in accordance with an illustrative embodiment. Aircraft cabin 100 may be any open area on the interior of aircraft 102. For example, without limitation, aircraft cabin 100 may refer to an open interior portion of aircraft 102 that may be configured to carry passengers, cargo, or both. In this example, aircraft 102 may be a commercial passenger aircraft. In other illustrative embodiments, aircraft 102 may be a military or government aircraft or any aircraft configured to carry passengers, cargo, or both in aircraft cabin 100.

A portion of aircraft cabin 100 may include overhead area 104. Overhead area 104 may include a portion of aircraft cabin 100 that is located in the crown of aircraft 102. For example, overhead area 104 may include a portion of aircraft cabin 100 that is located above the main flight deck level of aircraft 102.

Crew rest area 106 may be a portion of aircraft cabin 100 that is separated from other portions of aircraft cabin 100 in which passengers may be seated or in which cargo is carried. In accordance with an illustrative embodiment, a portion of overhead area 104 may be configured as crew rest area 106. For example, crew rest area 106 may be configured to contain bunks, seats, and other amenities that may be used by crew members of aircraft 102 to obtain needed rest.

Crew rest area 106 may be implemented in aircraft 102 as crew rest area module 108. Crew rest area module 108 may comprise a number of pieces that may be installed in overhead area 104 to form crew rest area 106. Crew rest area module 108 may be used to implement crew rest area 106 in overhead area 104 in a reduced amount of time and in a manner that may reduce modifications to aircraft 102.

Primary access 109 to overhead area 104 provides the normal route for crew members to enter and exit crew rest area 106 during aircraft operations. Primary access 109 may also be referred to as the primary exit for crew rest area 106. For example, primary access 109 may include stairs 110 or ladder 111 extending from passenger cabin 112 or another location on the main flight deck level of aircraft 102 to crew rest area 106.

A secondary exit from overhead area 104 may be provided via opening 113. Opening 113 also may be referred to as a hatchway. Opening 113 may provide for more rapid egress from crew rest area 106 than primary access 109. For example, opening 113 may provide a second and more rapid route for exiting crew rest area 106 in certain situations where rapid evacuation of crew rest area 106 and of aircraft 102 is desired.

Opening 113 opens downward from crew rest area 106 into an area of aircraft cabin 100 below overhead area 104. For example, without limitation, opening 113 may be provided in floor 114 of crew rest area 106 or at another location in crew rest area 106 such that opening 113 opens downward from crew rest area 106.

Opening 113 may be closed by hatch 130. Hatch 130 may comprise a door or other structure that closes opening 113 when hatch 130 is closed and that may be opened from crew rest area 106 to open opening 113.

Crew rest area 106 may be located in overhead area 104 over undesired area 115 of aircraft cabin 100. In this case, opening 113 may open downward into undesired area 115. Undesired area 115 may be any area within aircraft cabin 100 that is undesirable as an area through which an evacuee exiting crew rest area 106 via opening 113 may pass.

For example, without limitation, undesired area 115 may be passenger suite 116. Passenger suite 116 is an enclosed area of aircraft cabin 100 that may be separated by walls and a door from passenger cabin 112 of aircraft 102. Aircraft exit door 120 for exiting aircraft 102 may be located in passenger cabin 112. Passenger suite 116 is an example of undesired area 115, because an evacuee from crew rest area 106 that enters passenger suite 116 must pass through multiple doors before reaching aircraft exit door 120. An evacuation route from crew rest area 106 that passes through passenger suite 116 may be prohibited by safety regulations for aircraft 102.

As another example, undesired area 115 may be an area of aircraft cabin 100 that includes obstacle 122. For example, without limitation, obstacle 122 may be seat 124 or other furniture, obstacles, or combinations of obstacles that an evacuee exiting crew rest area 106 straight downward via opening 113 may step over or on. In this case, seat 124 or other obstacle 122 may need to be reinforced or otherwise designed to support the weight of persons that may step on seat 124 or other obstacle 122 when exiting crew rest area 106 straight downward via opening 113. Obstacle 122 also may make it more difficult to quickly exit crew rest area 106 straight downward via opening 113 in an emergency situation.

Desired area 126 may be any area within aircraft cabin 100 that is desirable as an area through which an evacuee exiting crew rest area 106 via opening 113 may pass. For example, without limitation, desired area 126 may be passenger cabin 112 with direct access to aircraft exit door 120 from passenger cabin 112. As another example, desired area 126 may be aisle 128 in passenger cabin 112. Aisle 128 may be a portion of passenger cabin 112 that does not include seat 124 or other obstacle 122. Aisle 128 may provide an unobstructed path through passenger cabin 112 to aircraft exit door 120.

Egress apparatus 132 is associated with opening 113 and hatch 130. Egress apparatus 132 is configured to move from closed state 134 to open state 136. Normally, egress apparatus 132 will remain in closed state 134 while opening 113 is closed during normal operation of aircraft 102. In closed state 134, egress apparatus 132 is positioned out of the way so that the impact of egress apparatus 132 on the activities of crew and passengers on aircraft 102 is reduced.

When desired, opening 113 may be opened, and egress apparatus 132 may be deployed from closed state 134 to open state 136. For example, egress apparatus 132 may be deployed from closed state 134 to open state 136 by a crew member or other person located in crew rest area 106. In open state 136, egress apparatus 132 is configured to direct a crew member from opening 113 located over undesired area 115 in aircraft 102 to desired area 126. For example, in open state 136, egress apparatus 132 may direct the crew member from opening 113 in crew rest area 106 located over passenger suite 116 to aisle 128 or another location in passenger cabin 112 of aircraft 102. The crew member may then exit aircraft 102 from passenger cabin 112 via aircraft exit door 120 without entering passenger suite 116.

In one illustrative embodiment, egress apparatus 132 comprises ramp 138. Ramp 138 may be positioned in opening 113 such that a portion of ramp 138 forms hatch 130 for closing opening 113 when ramp 138 is in closed state 134. As ramp 138 is moved from closed state 134 to open state 136, opening 113 is opened. Ramp 138 rotates downward with respect to opening 113 and extends laterally outward away from opening 113 as ramp 138 is moved from closed state 134 to open state 136. When ramp 138 is in open state 136, ramp 138 extends from opening 113 to desired area 126 in aircraft cabin 100. An evacuee from crew rest area 106 may move through opening 113 and across ramp 138 to exit from crew rest area 106 directly to desired area 126 in aircraft cabin 100 without entering undesired area 115.

In another illustrative embodiment, egress apparatus 132 comprises platform and guide panel 140. Platform and guide panel 140 may be attached to a wall located below opening 113. Platform and guide panel 140 may be in closed state 134 when hatch 130 is closed. In closed state 134, platform and guide panel 140 may be folded up against the wall to which platform and guide panel 140 is attached. Platform and guide panel 140 may move to open state 136 when hatch 130 is opened. In open state 136, platform and guide panel 140 extend outward from the wall into the space below opening 113. In open state 136, platform and guide panel 140 are configured to direct a crew member exiting crew rest area 106 through opening 113 to desired area 126 in aircraft 102. An evacuee from crew rest area 106 may move through opening 113 and across platform and guide panel 140 to exit from crew rest area 106 directly to desired area 126 in aircraft cabin 100 without entering undesired area 115.

In accordance with an illustrative embodiment, a lower portion of hatch 130 or a portion of egress apparatus 132 may be formed to look like closed overhead storage bin 142 in aircraft cabin 100. For example, a panel that forms a portion of hatch 130 or of ramp 138 may be configured to look like closed overhead storage bin 142 when hatch 130 is closed or egress apparatus 132 is in closed state 134.

The illustration of FIG. 1 is not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined or divided into different blocks when implemented in different illustrative embodiments.

Figure 2:
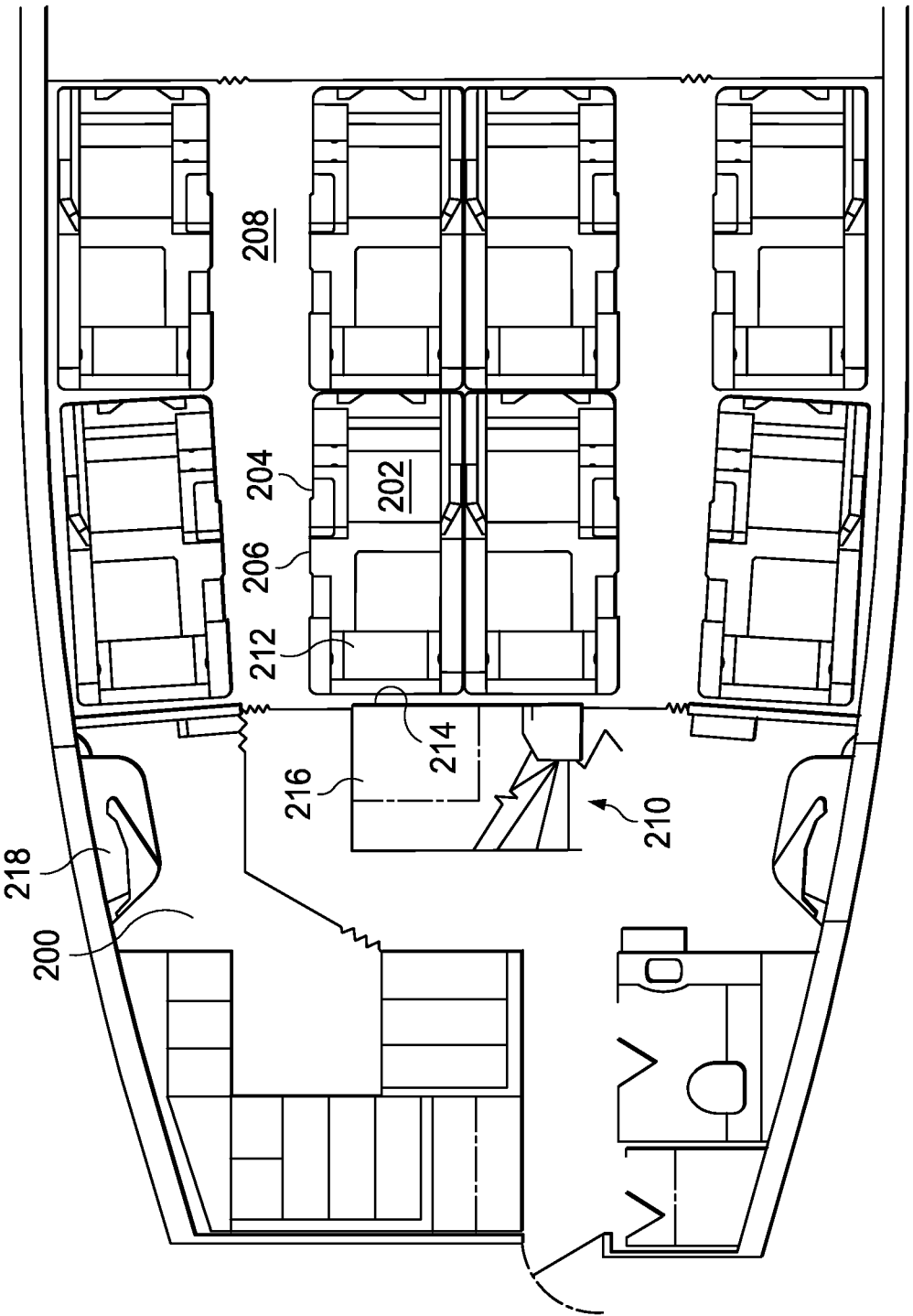
FIG. 2 is an illustration of a plan view of an aircraft cabin in accordance with an illustrative embodiment.

Turning now to FIG. 2, an illustration of a plan view of an aircraft cabin is depicted in accordance with an illustrative embodiment. In this example, aircraft cabin 200 is an example of a portion of a main deck in aircraft cabin 100 in FIG. 1.

In this example, aircraft cabin 200 includes passenger suite 202. Passenger suite 202 is separated from the rest of aircraft cabin 200 by walls 204 and door 206. Door 206 may be opened to provide access to passenger suite 202 from aisle 208 of aircraft cabin 200. Aisle 208 may provide an unobstructed route through aircraft cabin 200 to aircraft exit door 218 for exiting the aircraft.

A crew rest area may be located in an overhead area of aircraft cabin 200 above passenger suite 202. Primary access to and from the crew rest area may be via stairs 210 that lead from the main deck in aircraft cabin 200 up to the crew rest area in the overhead area. A secondary exit from the crew rest area may be provided in the form of an opening in the floor or another location in the crew rest area. Location 212 indicates the location of such an opening in the crew rest area. In this example, the opening is positioned above passenger suite 202.

Passenger suite 202 may be considered an undesired area of aircraft cabin 200 through which a person exiting the overhead area via the opening at location 212 should not pass. Aisle 208 may be considered a desired area of aircraft cabin 200 through which a person exiting the overhead area via the opening at location 212 may pass.

In accordance with an illustrative embodiment, an egress apparatus (not shown in FIG. 2) may be associated with the opening at location 212. In an open state, the egress apparatus may extend from location 212 of the opening over passenger suite 202 to aisle 208. In the open state, the egress apparatus directs a person exiting the overhead area via the opening at location 212 from the opening to the desired area of aisle 208 so that the person exiting the overhead area via the opening need not enter the undesired area of passenger suite 202 on the way to exiting the aircraft.

In one example of an illustrative embodiment, the egress apparatus may include a ramp positioned in the opening at location 212. In a closed state, the ramp may close the opening. In an open state, the ramp may extend from location 212 of the opening to aisle 208.

In another example of an illustrative embodiment, the egress apparatus may include a platform and guide panel attached to wall 214 of crew rest enclosure 216 below location 212 of the opening from the overhead area. In this case, the opening may be closed by a hatch. In a closed state, the platform and guide panel may be folded up against wall 214 so that the platform and guide panel does not interfere with use of passenger suite 202. In an open state, the platform and guide panel may extend outward from wall 214 below the opening at location 212 and may extend from below location 212 to aisle 208.

Figure 3:
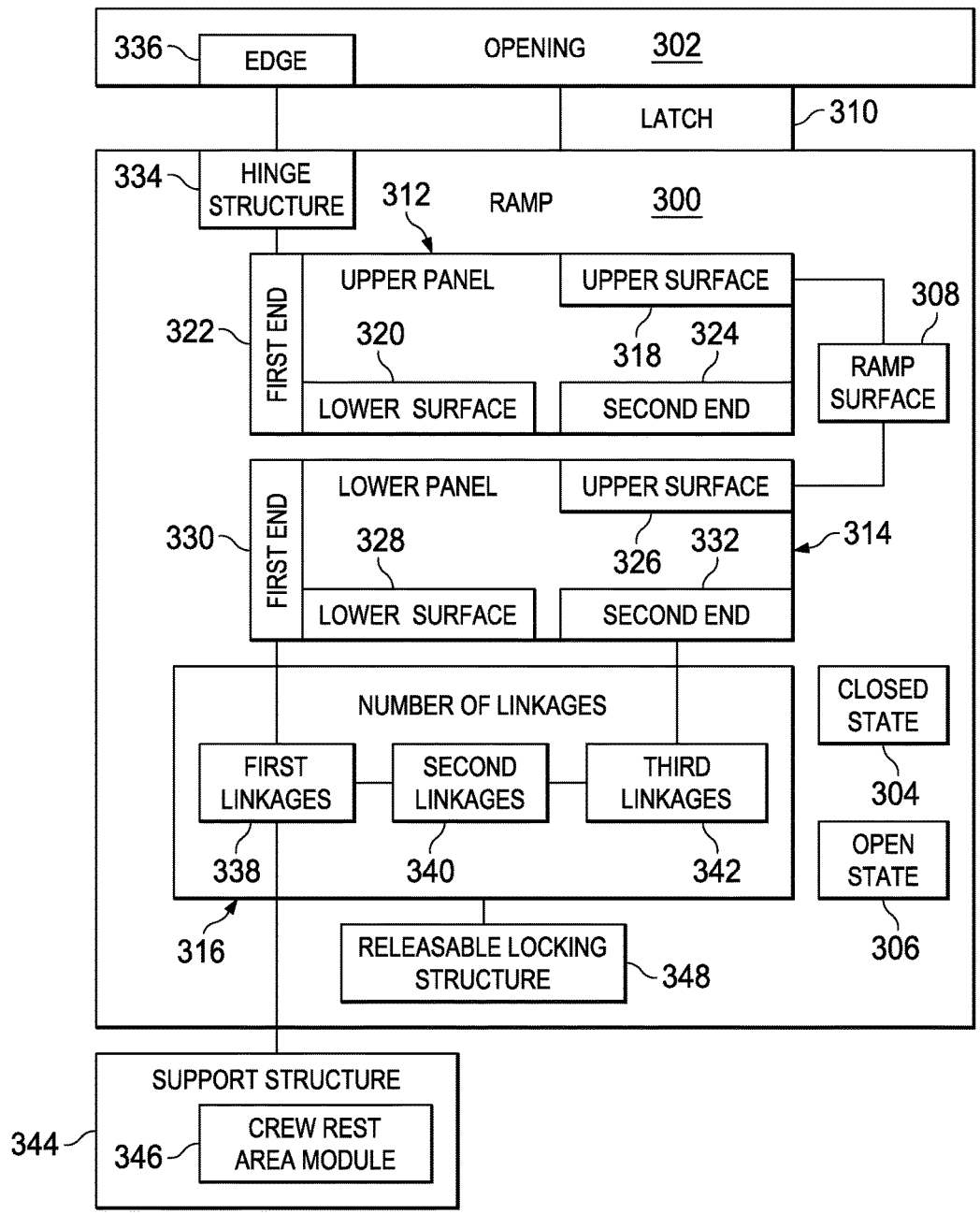
FIG. 3 is an illustration of a block diagram of a ramp egress apparatus in accordance with an illustrative embodiment.

Turning now to FIG. 3, an illustration of a block diagram of a ramp egress apparatus is depicted in accordance with an illustrative embodiment. In this example, ramp 300 is an example of one implementation of ramp 138 in FIG. 1.

Ramp 300 is located in opening 302. Opening 302 may provide an exit from an overhead area of an aircraft cabin. For example, opening 302 may provide a secondary exit from a crew rest area located in the overhead area. Opening 302 may be formed in the floor or another location of the crew rest area.

Opening 302 may be located over an undesired area in the aircraft cabin. It is undesirable that a person enters the undesired area when exiting the overhead area through opening 302 to evacuate the aircraft. For example, opening 302 may be located above a passenger suite or other undesired area in an aircraft cabin.

Ramp 300 is configured to move between closed state 304 and open state 306. Ramp 300 may be configured to close opening 302 when ramp 300 is in closed state 304. In open state 306, opening 302 is opened, and ramp 300 provides ramp surface 308 that extends from opening 302 to a desired area in the aircraft cabin. The desired area is an area that a person exiting the overhead area through opening 302 may pass through to evacuate the aircraft. For example, without limitation, the desired area may be an aisle or other location in the main passenger cabin of the aircraft.

Latch 310 may be provided to hold ramp 300 in closed state 304 in opening 302. Latch 310 may be any latching or other structure that holds ramp 300 in closed state 304 until latch 310 is released. Latch 310 may be released by an operator located in the overhead area of the aircraft cabin above opening 302. Ramp 300 may move from closed state 304 to open state 306 in response to releasing latch 310.

In accordance with an illustrative embodiment, ramp 300 may comprise upper panel 312, lower panel 314, and number of linkages 316. Upper panel 312 may be a substantially flat panel comprising upper surface 318, lower surface 320, first end 322, and second end 324. Upper panel 312 may be configured to close opening 302 when ramp 300 is in closed state 304. For example, without limitation, upper surface 318 of upper panel 312 may be configured to be flush with or form part of the floor of an overhead crew rest area when ramp 300 is in closed state 304.

Lower panel 314 may comprise upper surface 326, lower surface 328, first end 330, and second end 332. In accordance with an illustrative embodiment, lower panel 314 may be configured such that lower surface 328 of lower panel 314 looks like a closed door for an overhead storage bin on an aircraft when ramp 300 is in closed state 304.

First end 322 of upper panel 312 may be connected via hinge structure 334 to edge 336 of opening 302. Second end 324 of upper panel 312 is an end of upper panel 312 that is opposite first end 322. Hinge structure 334 may be any structure or number of structures that attaches first end 322 of upper panel 312 to edge 336 of opening 302 in a manner so that second end 324 of upper panel 312 may rotate with respect to first end 322. Second end 324 of upper panel 312 may rest on and be freely movable with respect to upper surface 326 of lower panel 314.

Upper panel 312 and lower panel 314 may be made of any appropriate material and in any appropriate manner such that upper panel 312 and lower panel 314 are able to support the weight of a person moving over ramp surface 308 when ramp 300 is in open state 306.

Number of linkages 316 may include first linkages 338, second linkages 340, and third linkages 342. Two sets of first linkages 338, second linkages 340, and third linkages 342 may be provided for ramp 300, with each set provided on opposite sides of ramp 300. The opposite sides of ramp 300 are the sides of ramp 300 that extend from first end 322 to second end 324 of upper panel 312 and from first end 330 to second end 332 of lower panel 314.

Number of linkages 316 are elongated structures. For example, without limitation, number of linkages 316 may be elongated bars or rods. Number of linkages 316 may be made of any appropriate material and in any appropriate manner such that number of linkages 316 is able to support ramp 300 in open state 306 as a person moves over ramp surface 308.

First linkages 338 may be rotatably connected at one end thereof to support structure 344 and rotatably connected at the other end thereof to first end 330 of lower panel 314. Second linkages 340 may be rotatably connected at one end thereof to first linkages 338 near the end thereof that is attached to support structure 344 and rotatably connected at the other end thereof to one end of third linkages 342. Third linkages 342 may be rotatably connected at one end thereof to the end of second linkages 340 and at the other end thereof to second end 332 of lower panel 314. The rotatable connections of number of linkages 316 may be implemented in any appropriate manner and using any appropriate structures to provide the movement of ramp 300 described herein. It is also desirable that the rotatable connections of number of linkages 316 be implemented in an appropriate manner and using appropriate structures such that number of linkages 316 is able to support ramp 300 in open state 306 as a person moves over ramp surface 308.

Support structure 344 refers to a structure adjacent to opening 302 that is not moveable with respect to opening 302. For example, without limitation, support structure 344 may be a portion of crew rest area module 346 in which opening 302 is formed.

Number of linkages 316 is configured to move ramp 300 between closed state 304 and open state 306. Number of linkages 316 may operate to move lower panel 314 downward and laterally outward from opening 302. Number of linkages 316 also may be configured to move second end 332 of lower panel 314 downward with respect to first end 330 of lower panel 314. As lower panel 314 moves downward and outward, upper panel 312 rotates downward about first end 322 as second end 324 of upper panel 312 moves downward on upper surface 326 of lower panel 314. When ramp 300 is in open state 306, upper surface 318 of upper panel 312 and a portion of upper surface 326 of lower panel 314 form ramp surface 308.

Movement of ramp 300 from closed state 304 to open state 306 may be started and maintained by gravity pulling downward on the weight of ramp 300 after latch 310 is released. Alternatively, movement of ramp 300 from closed state 304 to open state 306 may be started, maintained, or aided by manually pushing downward on ramp 300. As another example, without limitation, a spring mechanism or other mechanical structure may be used to start, maintain, or aid the movement of ramp 300 from closed state 304 to open state 306.

Releasable locking structure 348 may be provided to lock ramp 300 in open state 306. Releasable locking structure 348 may be any structure that locks ramp 300 in open state 306 and that may be released by an operator to move ramp 300 from open state 306 back to closed state 304. For example, without limitation, releasable locking structure 348 may be an appropriate structure that is attached to or formed on number of linkages 316. Releasable locking structure 348 may be configured to automatically lock ramp 300 in open state 306 when ramp 300 is moved from closed state 304 to open state 306.

Releasable locking structure 348 may be released when it is desired to move ramp 300 from open state 306 back to closed state 304. With releasable locking structure 348 released, ramp 300 may be moved from open state 306 to closed state 304 by pushing generally upward on lower surface 328 of lower panel 314. With generally upwardly directed force applied to lower surface 328 of lower panel 314, number of linkages 316 will operate to move ramp 300 from open state 306 to closed state 304. Ramp 300 may be locked in closed state 304 by latch 310. For example, without limitation, latch 310 may be configured to manually or automatically re-engage ramp 300 to lock ramp 300 in closed state 304 when ramp 300 is moved from open state 306 to closed state 304.

Turning now to FIG. 4, an illustration of a perspective view of a ramp egress apparatus in a closed state is depicted in accordance with an illustrative embodiment. In this example, ramp 300 in closed state 400 is an example of one implementation of ramp 300 in FIG. 3. The same reference numerals used to identify the components of ramp 300 in FIG. 3 are used to identify the corresponding components of ramp 300 in closed state 400 in FIG. 4.

In this example, support structure 344 is a fixed structure around an opening. Ramp 300 in closed state 400 closes the opening. First linkages 338 are rotatably attached at one end thereof to support structure 344. First end 322 of upper panel 312 is attached by a hinge structure (not shown in FIG. 4) to the edge of the opening. Lower surface 328 of lower panel 314 may be configured to look like the closed door of an overhead storage bin in an aircraft cabin for ramp 300 in closed state 400.

Turning now to FIG. 5, an illustration of a perspective view of a ramp egress apparatus in a partially-open state is depicted in accordance with an illustrative embodiment. In this example, ramp 300 in partially-open state 500 shows ramp 300 in closed state 400 in FIG. 4 as ramp 300 in closed state 400 is moved partially from a closed state to an open state. The same reference numerals used to identify the components of ramp 300 in FIG. 3 are used to identify the corresponding components of ramp 300 in partially-open state 500 in FIG. 5.

In this example, attachment structure 501 provides a structure for rotatably attaching first linkages 338 and second linkages 340 to lower panel 314. First linkages 338, second linkages 340, and third linkages 342 are configured to operate together to displace lower panel 314 downward in the direction indicated by arrow 502 and laterally outward in the direction indicated by arrow 504. First linkages 338, second linkages 340, and third linkages 342 are also configured to operate together to move second end 332 of lower panel 314 downward with respect to first end 330 of lower panel 314. Second end 324 of upper panel 312 rests on and is movable with respect to upper surface 326 of lower panel 314. As lower panel 314 moves downward and outward, second end 324 of upper panel 312 moves downward as second end 324 of upper panel 312 slides along upper surface 326 of lower panel 314. Upper panel 312 rotates downward about first end 322 thereof as second end 324 of upper panel 312 moves downward.

Figure 6:
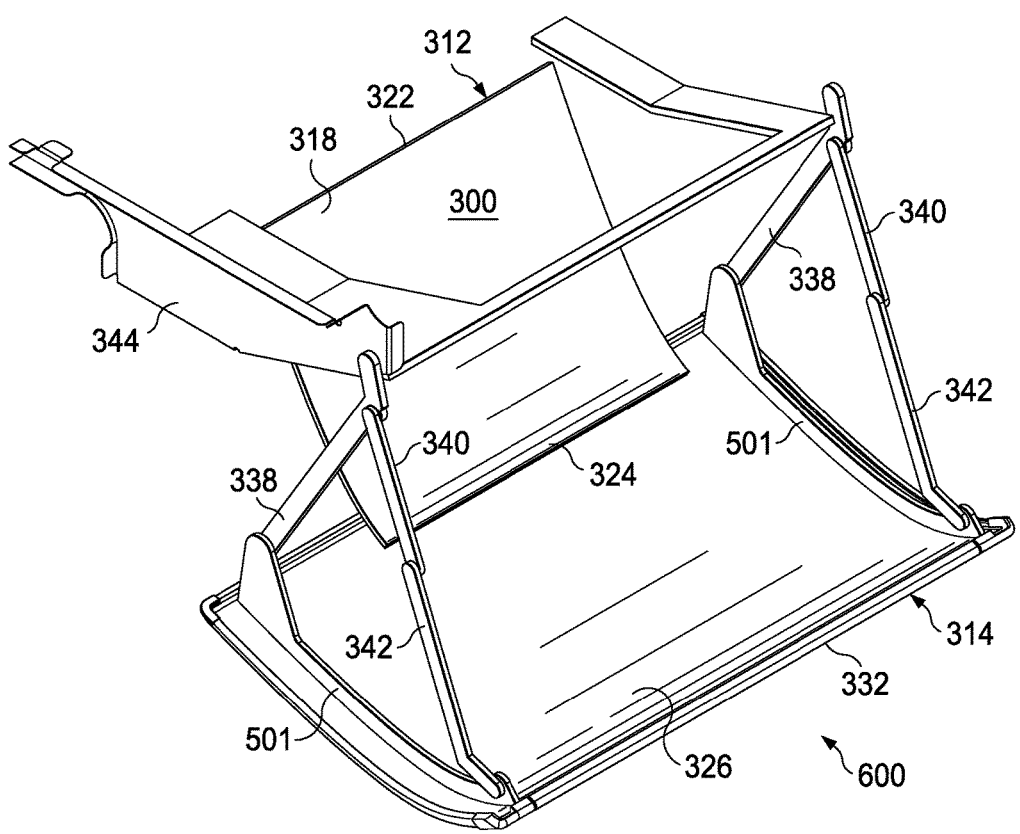
FIG. 6 is an illustration of a perspective view of a ramp egress apparatus in an open state in accordance with an illustrative embodiment.

Turning now to FIG. 6, an illustration of a perspective view of a ramp egress apparatus in an open state is depicted in accordance with an illustrative embodiment. In this example, ramp 300 in open state 600 shows ramp 300 in partially-open state 500 in FIG. 5 as ramp 300 in partially-open state 500 is moved from a partially-open state to a fully-open state. The same reference numerals used to identify the components of ramp 300 in FIG. 3 are used to identify the corresponding components of ramp 300 in open state 600 in FIG. 6.

In this example, upper surface 318 of upper panel 312 and upper surface 326 of lower panel 314 form a ramp surface that extends downward and laterally outward from the opening adjacent to support structure 344. First linkages 338, second linkages 340, and third linkages 342 are configured to support upper panel 312 and lower panel 314 in the desired positions for ramp 300 in open state 600 as a person moves from the opening across the ramp surface. For example, the person may move across the ramp surface from an opening formed as an exit in an overhead crew rest area on an aircraft to a desired area in an aircraft cabin from which the person may exit the aircraft.

Figure 7:
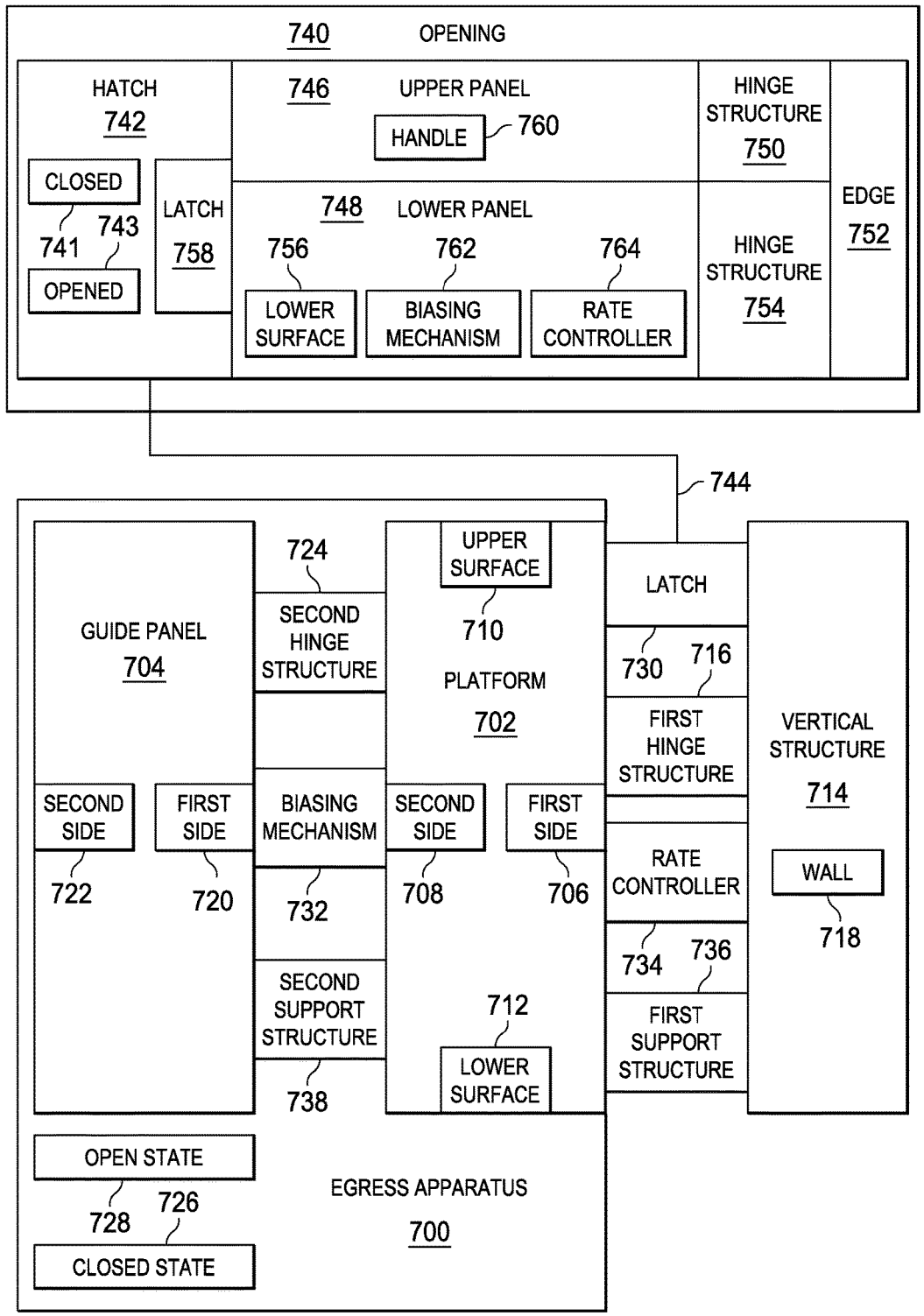
FIG. 7 is an illustration of a block diagram of a platform and guide panel egress apparatus in accordance with an illustrative embodiment.

Turning now to FIG. 7, an illustration of a block diagram of a platform and guide panel egress apparatus is depicted in accordance with an illustrative embodiment. In this example, egress apparatus 700 is an example of one implementation of platform and guide panel 140 in FIG. 1. Egress apparatus 700 comprises platform 702 and guide panel 704.

Platform 702 includes first side 706, second side 708, upper surface 710, and lower surface 712. Second side 708 of platform 702 may be a side of platform 702 that is opposite of first side 706 of platform 702.

Platform 702 may be attached to vertical structure 714 via first hinge structure 716. For example, first side 706 of platform 702 may be attached to vertical structure 714 via first hinge structure 716.

Vertical structure 714 may be any substantially vertical structure located in a cabin of an aircraft. For example, without limitation, vertical structure 714 may include wall 718 in the cabin of an aircraft. For example, without limitation, vertical structure 714 may be wall 718 or another vertical structure that is part of a module forming an overhead crew rest area in an aircraft cabin.

Guide panel 704 may include first side 720 and second side 722. Second side 722 of guide panel 704 may be a side of guide panel 704 that is opposite of first side 720 of guide panel 704.

Guide panel 704 may be attached to platform 702 by second hinge structure 724. For example, first side 720 of guide panel 704 may be attached to platform 702 at or near second side 708 of platform 702 via second hinge structure 724.

Egress apparatus 700 may be moved from closed state 726 to open state 728. In closed state 726, platform 702 and guide panel 704 may be folded together against vertical structure 714. For example, without limitation, in closed state 726, platform 702 and guide panel 704 may be substantially parallel with vertical structure 714. In this example, in closed state 726, guide panel 704 may be positioned between platform 702 and vertical structure 714.

In open state 728, platform 702 extends from vertical structure 714, and guide panel 704 extends upward from platform 702. For example, in open state 728, platform 702 may extend substantially horizontally or at another appropriate angle from vertical structure 714, and guide panel 704 may extend substantially vertically or at another appropriate angle upward from platform 702.

Latch 730 may be provided to hold egress apparatus 700 in closed state 726 until latch 730 is released. For example, latch 730 may include a moveable pin or other structure that holds egress apparatus 700 in closed state 726 and that may be moved to release latch 730. When latch 730 is released, egress apparatus 700 may be moved from closed state 726 to open state 728.

Egress apparatus 700 may be configured to move automatically from closed state 726 to open state 728 when latch 730 is released. For example, without limitation, biasing mechanism 732 may be provided to rotate guide panel 704 away from platform 702 about second hinge structure 724. For example, without limitation, biasing mechanism 732 may include a spring mechanism associated with second hinge structure 724 or another appropriate biasing mechanism. When egress apparatus 700 is in closed state 726, guide panel 704 may be positioned between platform 702 and vertical structure 714. When latch 730 is released, biasing mechanism 732 will operate to push guide panel 704 against vertical structure 714 as guide panel 704 is rotated away from platform 702. As guide panel 704 pushes against vertical structure 714, platform 702 will be rotated away from vertical structure 714 on first hinge structure 716. Gravity may then pull downward on platform 702 as biasing mechanism 732 continues to rotate guide panel 704 away from platform 702 to move egress apparatus 700 to open state 728.

Rate controller 734 may be provided to control the rate at which platform 702 rotates downward away from vertical structure 714 as egress apparatus 700 is moved from closed state 726 to open state 728. For example, without limitation, rate controller 734 may be a hydraulic or other mechanism that is configured to reduce the rate at which platform 702 rotates away from vertical structure 714. In one example, without limitation, rate controller 734 may be connected between platform 702 and vertical structure 714 to control the rate at which platform 702 rotates away from vertical structure 714.

First support structure 736 may be provided to limit the amount by which platform 702 rotates away from vertical structure 714. For example, without limitation, first support structure 736 may be a flexible strap or other structure that is connected between platform 702 and vertical structure 714 to limit the amount by which platform 702 rotates away from vertical structure 714.

Second support structure 738 may be provided to limit the amount by which guide panel 704 rotates away from platform 702. For example, without limitation, second support structure 738 may be a flexible strap or other structure that is connected between guide panel 704 and platform 702 to limit the amount by which guide panel 704 rotates away from platform 702.

In open state 728, platform 702 extends below opening 740. Opening 740 may provide an exit from an overhead area of an aircraft cabin. For example, opening 740 may provide a secondary exit from a crew rest area located in the overhead area. Opening 740 may be formed in the floor or another location of the crew rest area.

Opening 740 may be located over an undesired area in the aircraft cabin. It is undesirable that a person enters the undesired area when exiting the overhead area through opening 740 to evacuate the aircraft. For example, opening 740 may be located above a passenger suite or other undesired area in an aircraft cabin.

In accordance with an illustrative embodiment, egress apparatus 700 in open state 728 provides a route from opening 740 to a desired area in an aircraft cabin so that a person exiting an overhead area through opening 740 need not enter an undesired area below opening 740. For example, with egress apparatus 700 in open state 728, platform 702 may extend from below opening 740 to the desired area. A person, thus, may exit opening 740 and move across upper surface 710 of platform 702 to the desired area without entering the undesired area below opening 740. Guide panel 704 helps to guide the person in the right direction along platform 702 and may prevent the person from entering the undesired area from platform 702.

Opening 740 may be closed 741 by hatch 742. Opening 740 may be opened 743 by opening hatch 742. Hatch 742 may be coupled to latch 730 so that latch 730 is released when hatch 742 is opened 743. For example, hatch 742 may be coupled to latch 730 so that latch 730 is released when hatch 742 is opened 743 by a selected amount. In this example, latch 730 may be released when hatch 742 is only partially opened 743. Therefore, since egress apparatus 700 may be moved automatically from closed state 726 to open state 728 when latch 730 is released, egress apparatus 700 may be automatically moved from closed state 726 to open state 728 when hatch 742 is opened.

For example, without limitation, hatch 742 may be coupled by line 744 or another structure to latch 730 so that latch 730 is released when hatch 742 is opened 743 by a selected amount. In this example, line 744 may be coupled between hatch 742 and latch 730 so that opening hatch 742 pulls on line 744, and pulling on line 744 to move line 744 by a selected amount releases latch 730.

Hatch 742 may include upper panel 746 and lower panel 748. Upper panel 746 may be attached via hinge structure 750 to edge 752 of opening 740. Lower panel 748 may be attached via hinge structure 754 to edge 752 of opening 740. Lower surface 756 of lower panel 748 may be configured to look like a closed overhead storage bin in an aircraft cabin.

Hatch 742 may be held closed 741 by latch 758. For example, latch 758 may include a number of latches or other structures for holding upper panel 746 and lower panel 748 closed 741 until latch 758 is released.

Handle 760 may be provided on upper panel 746 of hatch 742. An operator may open hatch 742 by pulling upward on handle 760. For example, an operator located in a crew rest area or other overhead area in an aircraft cabin may open hatch 742 by pulling upward on handle 760 to rotate upper panel 746 of hatch 742 upward about hinge structure 750 into the overhead area.

Handle 760 may be coupled to latch 758 such that latch 758 is released when handle 760 is actuated. For example, without limitation, handle 760 may be coupled to latch 758 so that lifting handle 760 by a first amount may release latch 758 to open lower panel 748. In this example, lifting handle 760 by a second amount may release latch 758 so that upper panel 746 may be opened by lifting up on handle 760.

Lower panel 748 may be configured to open automatically when latch 758 is released. For example, biasing mechanism 762 may be configured to rotate lower panel 748 on hinge structure 754 downward and away from opening 740 when latch 758 is released. For example, without limitation, biasing mechanism 762 may include a spring mechanism associated with hinge structure 754 or another appropriate biasing mechanism. Rate controller 764 may be provided to limit the rate at which lower panel 748 opens when latch 758 is released.

Egress apparatus 700 may be moved from open state 728 to closed state 726. In open state 728, platform 702 may extend substantially perpendicular to vertical structure 714, and guide panel 704 may extend substantially vertically upward from platform 702 at or near second side 708 of platform 702. From this state, rotating guide panel 704 toward platform 702 about second hinge structure 724 causes second support structure 738 to collapse and compress biasing mechanism 732.

Platform 702 may then be rotated about first hinge structure 716 to fold platform 702 and guide panel 704 together against vertical structure 714. Latch 730 may be configured to automatically engage to hold egress apparatus 700 in closed state 726 when platform 702 and guide panel 704 are folded back up against vertical structure 714. In this example, egress apparatus 700 may be moved from open state 728 to closed state 726 in which platform 702 and guide panel 704 are substantially parallel with vertical structure 714, and guide panel 704 is positioned between platform 702 and vertical structure 714.

FIGS. 8-12 illustrate examples of a platform and guide panel egress apparatus in various states. The reference numerals for the components of the platform and guide panel egress apparatus illustrated in FIGS. 8-12 correspond to the references numerals used for the corresponding components in FIG. 7.

Figure 8:
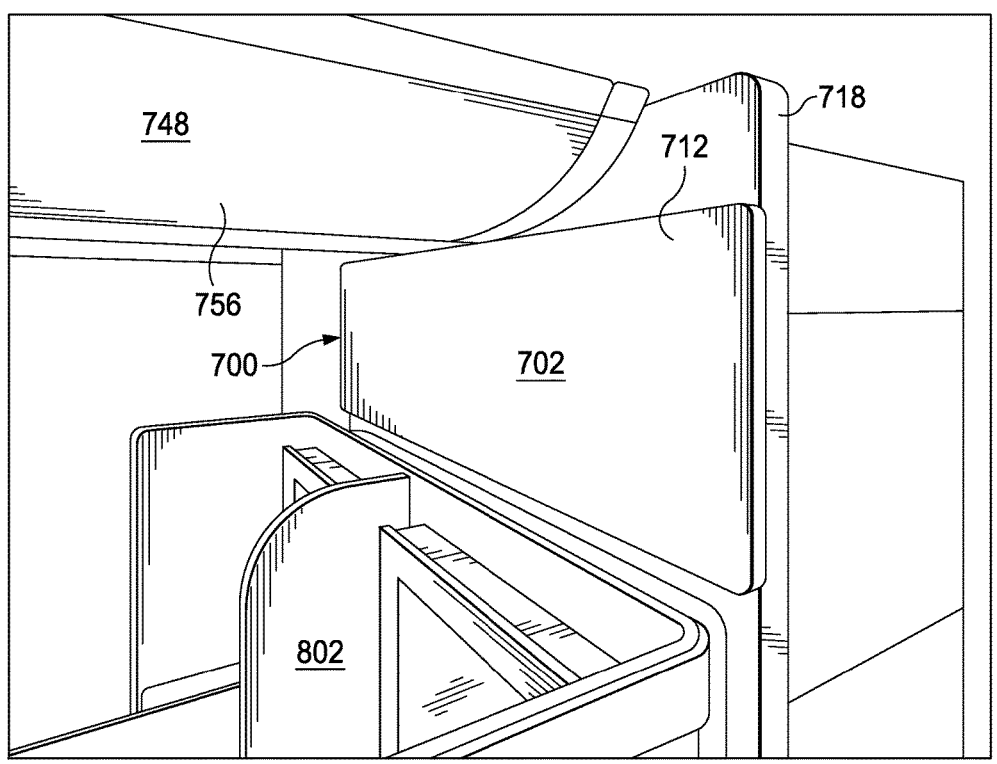
FIG. 8 is an illustration of a perspective view of a platform and guide panel egress apparatus in a closed state in accordance with an illustrative embodiment.

Turning now to FIG. 8, an illustration of a perspective view of a platform and guide panel egress apparatus in a closed state is depicted in accordance with an illustrative embodiment. In this example, egress apparatus 700 is shown folded up against wall 718 in an aircraft cabin to which egress apparatus 700 is attached. In this closed state, only lower surface 712 of platform 702 is visible to passengers in the aircraft cabin. Lower panel 748 of a hatch covers an opening (not shown in FIG. 8) in an overhead area. In this example, the opening is located above passenger suite 802 in the aircraft cabin. Lower surface 756 of lower panel 748 is configured to look like a closed overhead storage bin in the aircraft cabin.

Figure 9:
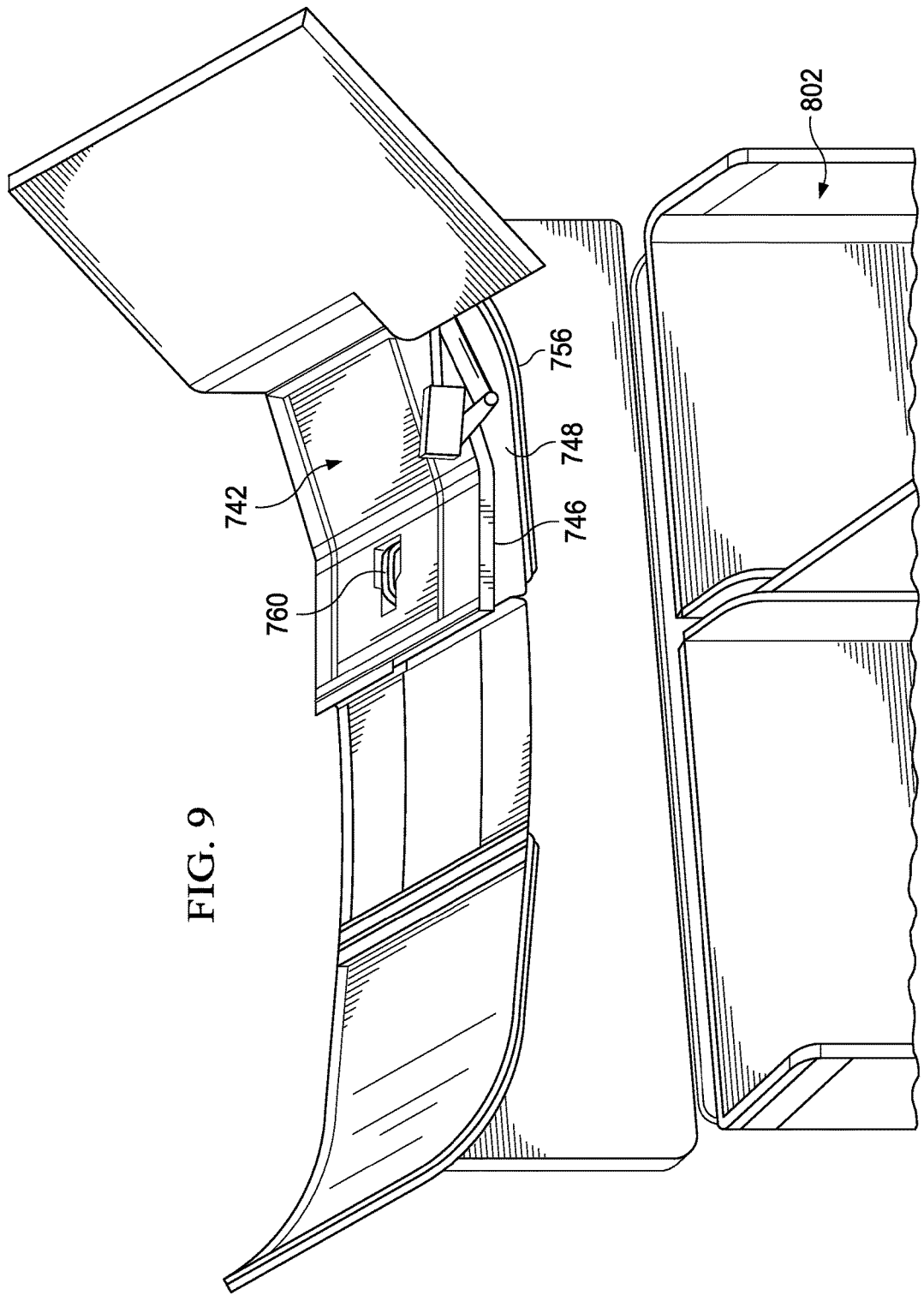
FIG. 9 is an illustration of a perspective view of a hatch in a closed state in accordance with an illustrative embodiment.

Turning now to FIG. 9, an illustration of a perspective view of a hatch in a closed state is depicted in accordance with an illustrative embodiment. In this example, hatch 742 closes an opening in an overhead area that is located above passenger suite 900 in an aircraft cabin. In this example, hatch 742 includes upper panel 746 and lower panel 748. Upper panel 746 includes handle 760 for lifting upper panel 746 upward to open hatch 742. Lower surface 756 of lower panel 748 is configured to look like a closed overhead storage bin in the aircraft cabin.

Figure 10:
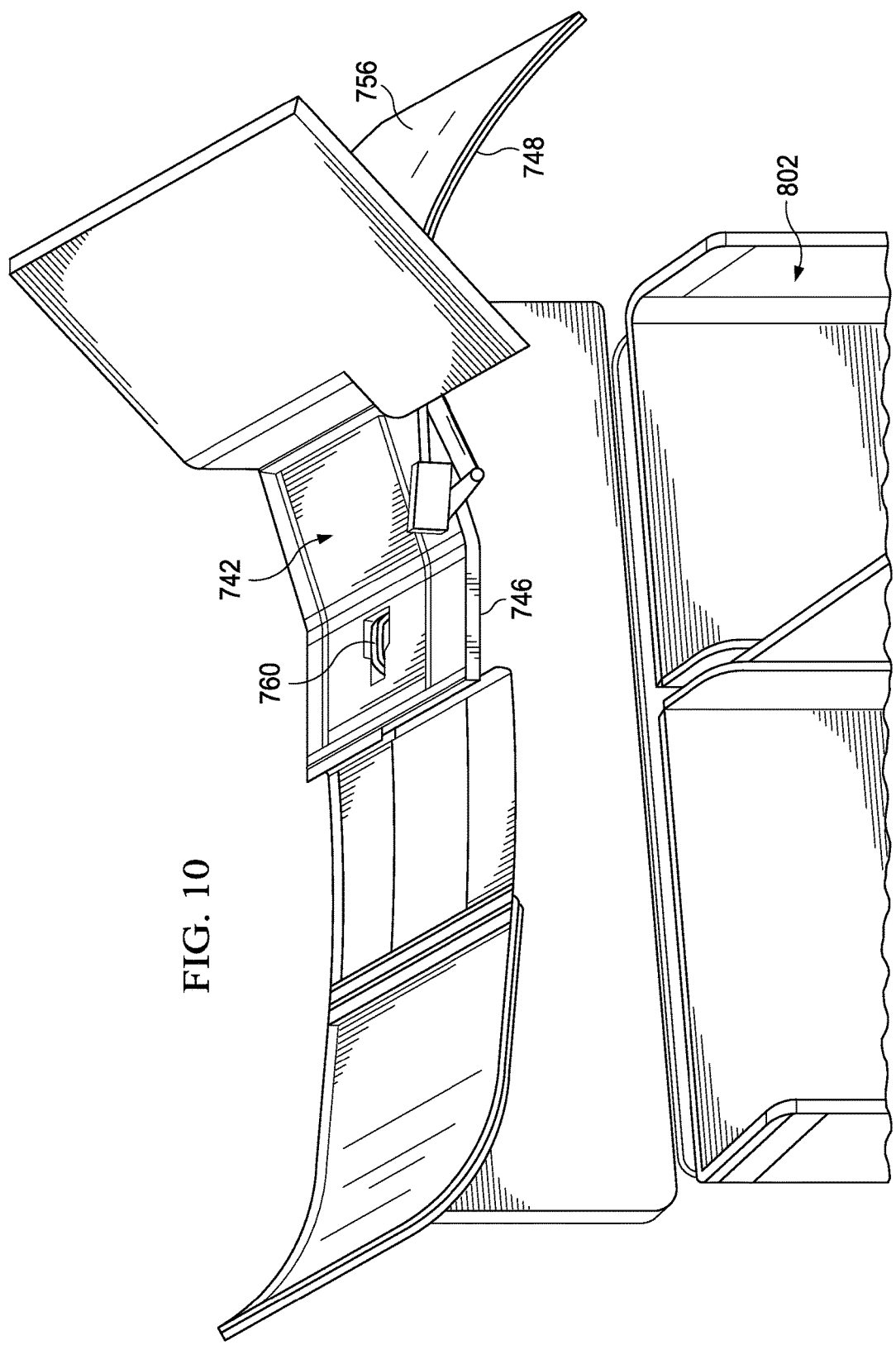
FIG. 10 is an illustration of a perspective view of a hatch with a lower panel of the hatch in an open state in accordance with an illustrative embodiment.

Turning now to FIG. 10, an illustration of a perspective view of a hatch with a lower panel of the hatch in an open state is depicted in accordance with an illustrative embodiment. In this example, lower panel 748 of hatch 742 in FIG.

9 is rotated downward and away from upper panel 746. Lower panel 748 may be rotated to the open position automatically when handle 760 is moved by a selected amount.

Figure 11:
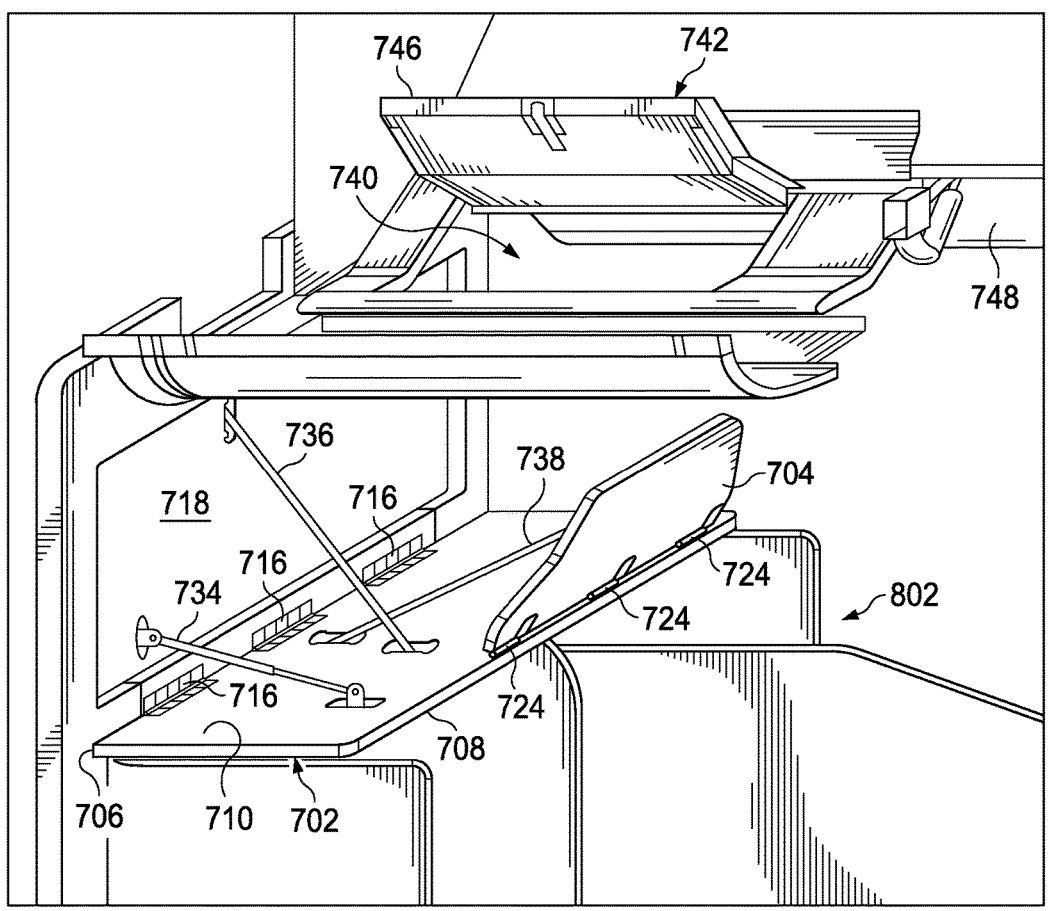
FIG. 11 is an illustration of a perspective view of a hatch in a partially-open state and a platform and guide panel egress apparatus in an open state in accordance with an illustrative embodiment.

Turning now to FIG. 11, an illustration of a perspective view of a hatch in a partially-open state and a platform and guide panel egress apparatus in an open state is depicted in accordance with an illustrative embodiment. In this example, upper panel 746 of hatch 742 in FIG. 10 is lifted upward to partially open opening 740. Platform 702 and guide panel 704 may move automatically from a closed state to an open state as illustrated in response to upper panel 746 being lifted by a selected amount.

In the open state, platform 702 extends outward from wall 718 and below opening 740. Platform 702 is attached to wall 718 along first side 706 of platform 702 by first hinge structure 716. In the open state, guide panel 704 extends upward from platform 702. Guide panel 704 is attached to second side 708 of platform 702 by second hinge structure 724.

In this example, rate controller 734 is attached between platform 702 and wall 718 to reduce the rate at which platform 702 rotates away from wall 718. First support structure 736 is attached between platform 702 and wall 718 to limit the amount of rotation of platform 702 with respect to wall 718. Second support structure 738 is attached between platform 702 and guide panel 704 to limit the amount of rotation of guide panel 704 with respect to platform 702.

Figure 12:
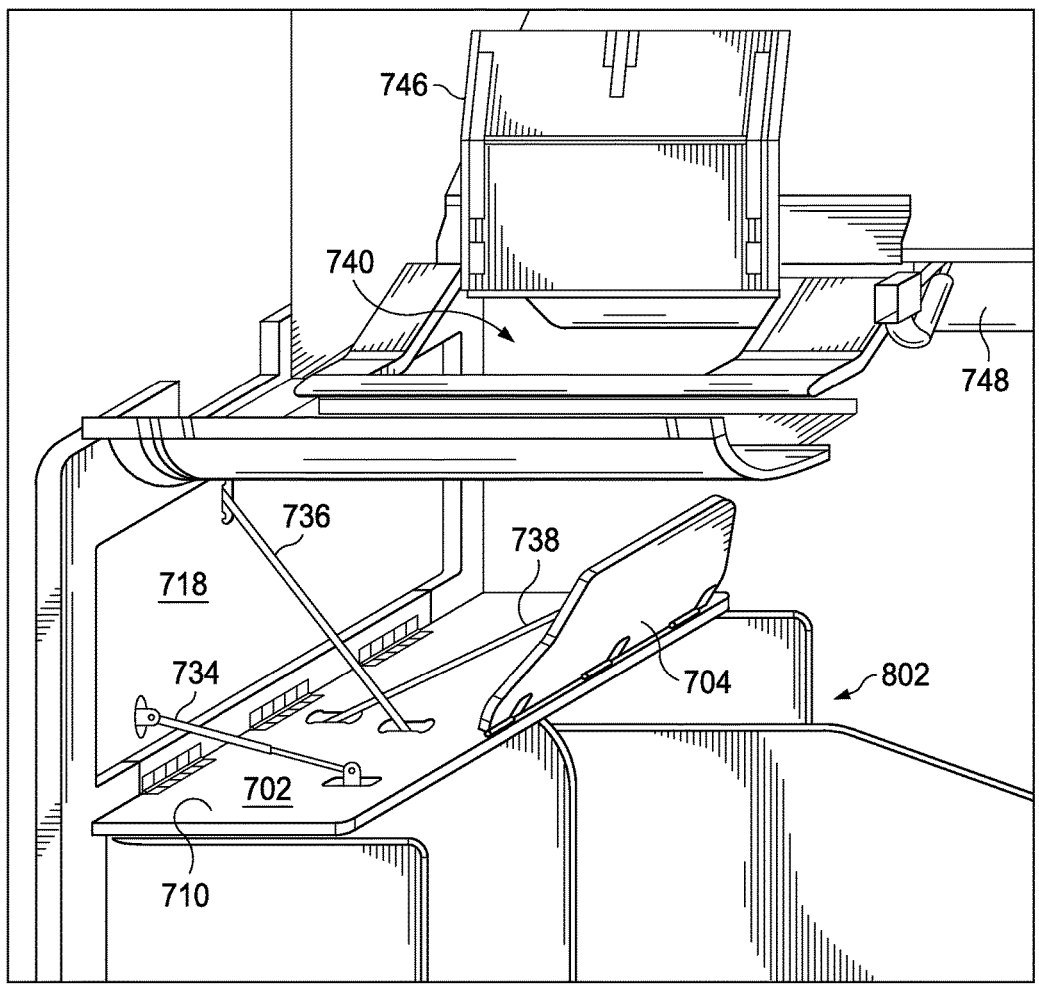
FIG. 12 is an illustration of a perspective view of a hatch in an open state and a platform and guide panel egress apparatus in an open state in accordance with an illustrative embodiment.

Turning now to FIG. 12, an illustration of a perspective view of a hatch in an open state and a platform and guide panel egress apparatus in an open state is depicted in accordance with an illustrative embodiment. In this example, upper panel 746 in FIG. 11 is rotated further such that opening 740 is fully open. Opening 740 is located above passenger suite 900. In this case, it is undesirable that a person evacuating an aircraft through opening 740 should enter passenger suite 900. However, platform 702 extends from below opening 740 to desired area 1200. Therefore, a person may exit an overhead area through opening 740 and move on upper surface 710 of platform 702 to desired area 1200 without entering passenger suite 900. Guide panel 704 directs the person in the desired direction along platform 702 and may prevent the person from moving into passenger suite 900 from platform 702.

Rate controller 734, first support structure 736, and second support structure 738 are positioned so that rate controller 734, first support structure 736, and second support structure 738 do not interfere with movement of a person from opening 740 to desired area 1200 on platform 702. Rate controller 734, first support structure 736, and second support structure 738 may be positioned so that one or more of rate controller 734, first support structure 736, and second support structure 738 may help to direct a person in the desired direction along platform 702. For example, one or more of rate controller 734, first support structure 736, and second support structure 738 may be positioned to interfere with movement of a person in an undesired direction along platform 702.

Figure 13:
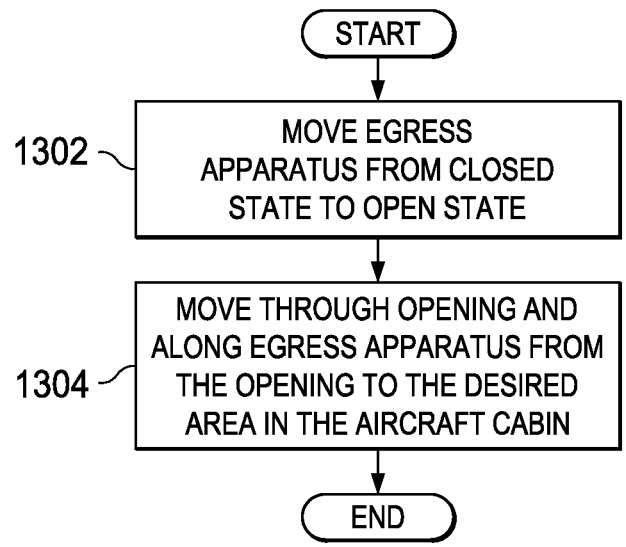
FIG. 13 is an illustration of a flowchart of a process for exiting an overhead area in an aircraft cabin in accordance with an illustrative embodiment.

Turning now to FIG. 13, an illustration of a flowchart of a process for exiting an overhead area in an aircraft cabin is depicted in accordance with an illustrative embodiment. The process in FIG. 13 may be used, for example, to exit crew rest area 106 using egress apparatus 132 in FIG. 1.

The process begins by moving the egress apparatus from a closed state to an open state (operation 1302). When the egress apparatus is in the open state, the egress apparatus may extend from the location of an opening above an undesired area in an aircraft cabin to a desired area in the aircraft cabin. Operation 1302 also may include opening a hatch that covers the opening. With the egress apparatus in the open state, a person may move through the opening and along the egress apparatus from the opening to the desired area in the aircraft cabin (operation 1304), with the process terminating thereafter.

Figure 14:
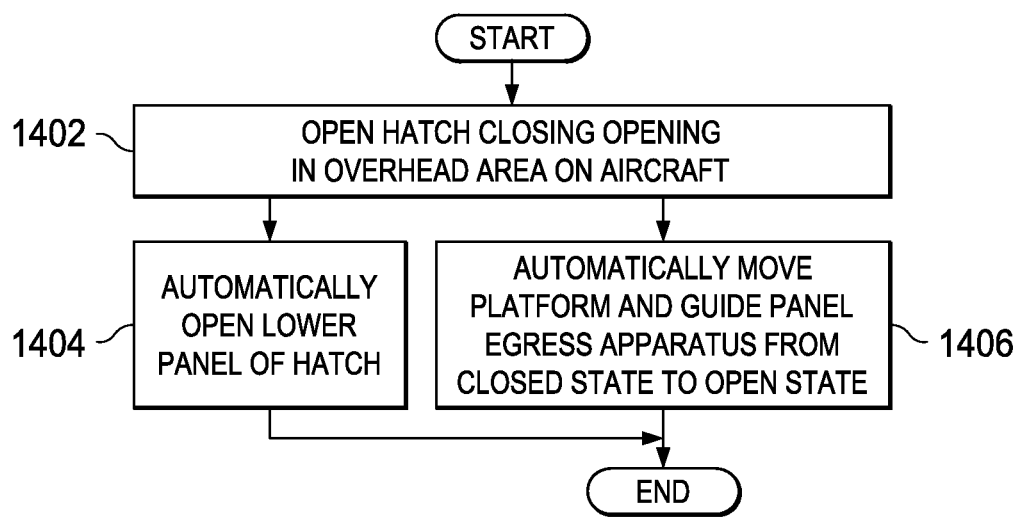
FIG. 14 is an illustration of a flowchart of a process for deploying a platform and guide panel egress apparatus in accordance with an illustrative embodiment.

Turning now to FIG. 14, an illustration of a flowchart of a process for deploying a platform and guide panel egress apparatus is depicted in accordance with an illustrative embodiment. The process in FIG. 14 may be used, for example, to move egress apparatus 700 in FIG. 7 from closed state 726 to open state 728. The process in FIG. 14 is an example of a process that may be used to perform operation 1302 in FIG. 13.

The process begins by opening a hatch that closes an opening in an overhead area in an aircraft (operation 1402). Operation 1402 may be performed by a person located in the overhead area. If the hatch comprises an upper panel and a lower panel, operation 1402 may include lifting upward on the upper panel from a location in the overhead area.

In this case, the lower panel of the hatch may automatically open (operation 1404) in response to opening the upper panel. In any case, the platform and guide panel egress apparatus may automatically move from a closed state to an open state (operation 1406) in response to opening the hatch, with the process terminating thereafter. A person may then move through the opening and across the egress apparatus in the open state.

Illustrative embodiments thus provide a series of mechanisms and panels that may be operated to form an egress apparatus that is configured to guide and facilitate egress from a crew rest area in the overhead area of an aircraft. One or more of the illustrative embodiments provides a capability to exit directly from the crew rest area to a passenger cabin on the main deck of an aircraft without first entering a passenger suite on the main deck that may be installed directly below the crew rest area. Furthermore, one or more of the illustrative embodiments provides a capability to exit directly from the crew rest area to an aisle on the main deck of an aircraft without stepping on or over seats or other potential obstacles that may be installed on the main deck directly below the crew rest area.

An apparatus for egress from a crew rest area in accordance with an illustrative embodiment may be contained wholly in a crew rest area module. Therefore, an egress apparatus in accordance with an illustrative embodiment need not impact the design or arrangement of structures on the aircraft, such as ceilings or fuselages; or main deck furnishings, such as seats and closets.

An apparatus for egress from a crew rest area in accordance with an illustrative embodiment may be self-supporting and thus may not result in any load sharing between the egress apparatus and any other aircraft structures. Therefore, the design of aircraft structures may be decoupled from any evacuation loads from the crew rest area.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a substantially vertical structure in a cabin of an aircraft;
a platform comprising a first side and a second side opposite the first side, wherein the first side of the platform is pivotably attached to the substantially vertical structure such that the platform is folded to a vertical position against the substantially vertical structure in a closed state and pivots to a horizontal position in an open state to extend substantially horizontally outward from the vertical structure, wherein the platform in the open state extends below an opening in an overhead area in the aircraft, and wherein the opening provides a downward exit from a crew rest area into the cabin below the overhead area; and
a guide panel pivotably attached to the second side of the platform such that the guide panel is folded against the platform in the closed state and pivots to the open state to extend upward from the second side of the platform, wherein the guide panel in the open state is configured to direct a person who exits from the crew rest area through the opening along the platform to a desired area in the cabin of the aircraft.

2. The apparatus of claim 1, wherein the substantially vertical structure is a wall in the cabin of the aircraft.

3. The apparatus of claim 2, wherein the wall is one of a plurality of walls that separate a passenger suite from a rest of the cabin of the aircraft.

4. The apparatus of claim 1,
wherein the opening is located over an undesired area in the cabin of the aircraft;
wherein the platform extends from below the opening to the desired area in the cabin of the aircraft;
wherein the undesired area is a passenger suite; and
wherein the desired area is a passenger cabin.

5. The apparatus of claim 4,
wherein the passenger suite is separated by walls and a door from the passenger cabin.

6. The apparatus of claim 5, further comprising a door for exiting the aircraft located in the passenger cabin.

7. An apparatus comprising:
a substantially vertical structure in a cabin of an aircraft;
a platform comprising a first side and a second side opposite the first side, wherein the first side of the platform is pivotably attached to the substantially vertical structure by a first hinge structure such that the platform is folded to a vertical position against the substantially vertical structure in a closed state and pivots to a horizontal position in an open state to extend substantially horizontally outward from the vertical structure, wherein the platform in the open state extends under an opening in an overhead area in the aircraft, and wherein the opening provides a downward exit from a crew rest area into the cabin below the overhead area;
a guide panel pivotably attached to the second side of the platform by a second hinge structure such that the guide panel is folded against the platform in the closed state and pivots to the open state to extend upward from the second side of the platform in the open state, wherein the guide panel in the open state is configured to direct a person who exits from the crew rest area through the opening along the platform to a desired area in the cabin of the aircraft;
a first support structure configured to limit an amount of rotation of the platform with respect to the substantially vertical structure; and
a second support structure configured to limit an amount of rotation of the guide panel with respect to the platform.

8. The apparatus of claim 7, wherein the substantially vertical structure is a wall in the cabin of the aircraft.

9. The apparatus of claim 7, wherein the platform and the guide panel are substantially parallel with the substantially vertical structure when the apparatus is in the closed state.

10. The apparatus of claim 7 further comprising a hatch configured to close the opening.

11. The apparatus of claim 10, wherein the hatch comprises an upper panel and a lower panel.

12. The apparatus of claim 10 further comprising a latch configured to hold the apparatus in the closed state, wherein the latch is coupled to the hatch such that the latch is released in response to opening the hatch.

13. The apparatus of claim 12, wherein the apparatus is configured to move automatically from the closed state to the open state in response to releasing the latch.

14. The apparatus of claim 7 further comprising a biasing mechanism configured to rotate the guide panel with respect to the platform.

15. The apparatus of claim 7 further comprising a rate controller configured to control a rate at which the apparatus moves from the closed state to the open state.

16. A method for deploying an apparatus, comprising:
opening a hatch that closes an opening in an overhead area in an aircraft, wherein the opening provides a downward exit from a crew rest area into a cabin of the aircraft below the overhead area; and
automatically moving the apparatus from a closed state to an open state in response to opening the hatch,
wherein the apparatus comprises a platform comprising a first side and a second side opposite the first side, wherein the first side of the platform is pivotably attached to a substantially vertical structure by a first hinge structure such that the platform is folded to a vertical position against the substantially vertical structure in the closed state and pivots to a horizontal position in the open state to extend substantially horizontally outward from the vertical structure, and a guide panel pivotably attached to the second side of the platform by a second hinge structure such that the guide panel is folded against the platform in the closed state and extends upward from the second side of the platform when the apparatus is in the open state, wherein the guide panel in the open state is configured to direct a person who exits from the crew rest area through the opening along the platform to a desired area in the cabin of the aircraft.

17. The method of claim 16, wherein opening the hatch comprises lifting the hatch from a location in the crew rest area located in the overhead area.

18. The method of claim 16,
wherein the opening is located over an undesired area in the cabin of the aircraft,
wherein the platform extends from under the opening to the desired area in the cabin, and
further comprising moving through the opening and on the platform to the desired area without entering the undesired area.

* * * * *